(12) United States Patent
Torno et al.

(10) Patent No.: US 12,222,879 B2
(45) Date of Patent: *Feb. 11, 2025

(54) INTEGRATED CIRCUIT DEVICE WITH CROSSBAR TO ROUTE TRAFFIC

(71) Applicant: Cypress Semiconductor Corporation, San Jose, CA (US)

(72) Inventors: Andreas Torno, Eching (DE); Roland Richter, Puchheim (DE); Joaquin Ibanez Montemayor, Gauting (DE)

(73) Assignee: Cypress Semiconductor Corporation, San Jose, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 18/172,978

(22) Filed: Feb. 22, 2023

(65) Prior Publication Data
US 2023/0273887 A1 Aug. 31, 2023

Related U.S. Application Data

(63) Continuation of application No. 17/496,572, filed on Oct. 7, 2021, now Pat. No. 11,609,871.

(51) Int. Cl.
*G06F 13/18* (2006.01)
*G06F 13/16* (2006.01)
*G06F 13/40* (2006.01)

(52) U.S. Cl.
CPC .......... *G06F 13/18* (2013.01); *G06F 13/1668* (2013.01); *G06F 13/4068* (2013.01); *G06F 13/409* (2013.01)

(58) Field of Classification Search
CPC .. G06F 13/18; G06F 13/1668; G06F 13/4068; G06F 13/409
See application file for complete search history.

(56) References Cited

U.S. PATENT DOCUMENTS

| | | | |
|---|---|---|---|
| 11,609,871 B1 * | 3/2023 | Torno | G06F 13/409 |
| 2005/0027920 A1 * | 2/2005 | Fitzsimmons | G06F 13/4022 |
| | | | 710/317 |
| 2010/0077127 A1 * | 3/2010 | Gupte | G06F 13/4022 |
| | | | 710/317 |
| 2019/0138493 A1 * | 5/2019 | Teh | G06F 13/1673 |
| 2019/0306005 A1 * | 10/2019 | Desai | G06F 13/1684 |
| 2021/0303978 A1 * | 9/2021 | Nagarajan | G06N 3/084 |
| 2021/0357347 A1 * | 11/2021 | Li | G06F 13/4022 |

\* cited by examiner

*Primary Examiner* — Phong H Dang

(57) ABSTRACT

Systems, methods, and devices include a crossbar unit to route traffic. Devices include a subsystem included in a microcontroller. Devices also include a crossbar unit configured to communicate with the subsystem, and further configured to communicate with an external memory device via a plurality of channels, wherein the crossbar unit is coupled to a set of masters, wherein the crossbar unit is configured to monitor bandwidth usage at the plurality of channels and route traffic between the set of masters and the plurality of channels based on the monitored bandwidth usage. Moreover, the crossbar unit includes a crossbar routing element configured to route traffic based on an operating mode of the crossbar unit.

20 Claims, 10 Drawing Sheets

INTEGRATED CIRCUIT DEVICE WITH CROSSBAR TO ROUTE TRAFFIC

CROSS-REFERENCE TO RELATED APPLICATION

This application is a Continuation of U.S. patent application Ser. No. 17/496,572, filed Oct. 7, 2021, now U.S. Pat. No. 11,609,871 issued on Mar. 21, 2023, which is incorporated by reference herein in its entirety.

BACKGROUND

Integrated circuits may use a variety of different types of interconnect busses. One example of an interconnect bus is an Advanced eXtensible Interface (AXI) bus. An AXI bus is a bus structure that may be used within a microcontroller and that connects subsystems (including, but not limited to, CPU subsystems, analog subsystems, digital subsystems, memory subsystems, clock subsystems, and I/O subsystems) and/or components (for example, analog-to-digital converters, memory, sensor controllers, and real time clocks). A subsystem of a microcontroller may be connected to an external memory via an interconnect bus, such as an AXI bus. However, unbalanced traffic on the AXI channels to the memory can lead to a performance loss.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

A subsystem of a microcontroller may be connected to an external memory via an interconnect bus, such as an Advanced eXtensible Interface (AXI) bus. Unbalanced traffic on the AXI channels to the memory may lead to a performance loss. A memory AXI channel may be connected to several masters through an arbiter. These masters may request more than 100% bandwidth of the channel but, at the same time, other masters may request less than 60% of the bandwidth of other memory AXI channels. This scenario may produce a bottleneck in a memory channel and generate back pressure to its masters. The response time per AXI request can increase, decreasing the overall performance of the system.

Some examples disclosed herein are directed to an integrated circuit (IC) device, such as a microcontroller device, which includes a crossbar unit that snoops the bandwidth usage in memory AXI data channels, and based on that information decides where to route future requests to balance the AXI traffic. In some examples, the crossbar unit balances the traffic routing of low priority read memory requests from low priority masters across the multiple channels of the interconnect bus based on information from a bandwidth monitoring mechanism to improve the bandwidth efficiency of the system.

Figure 1:
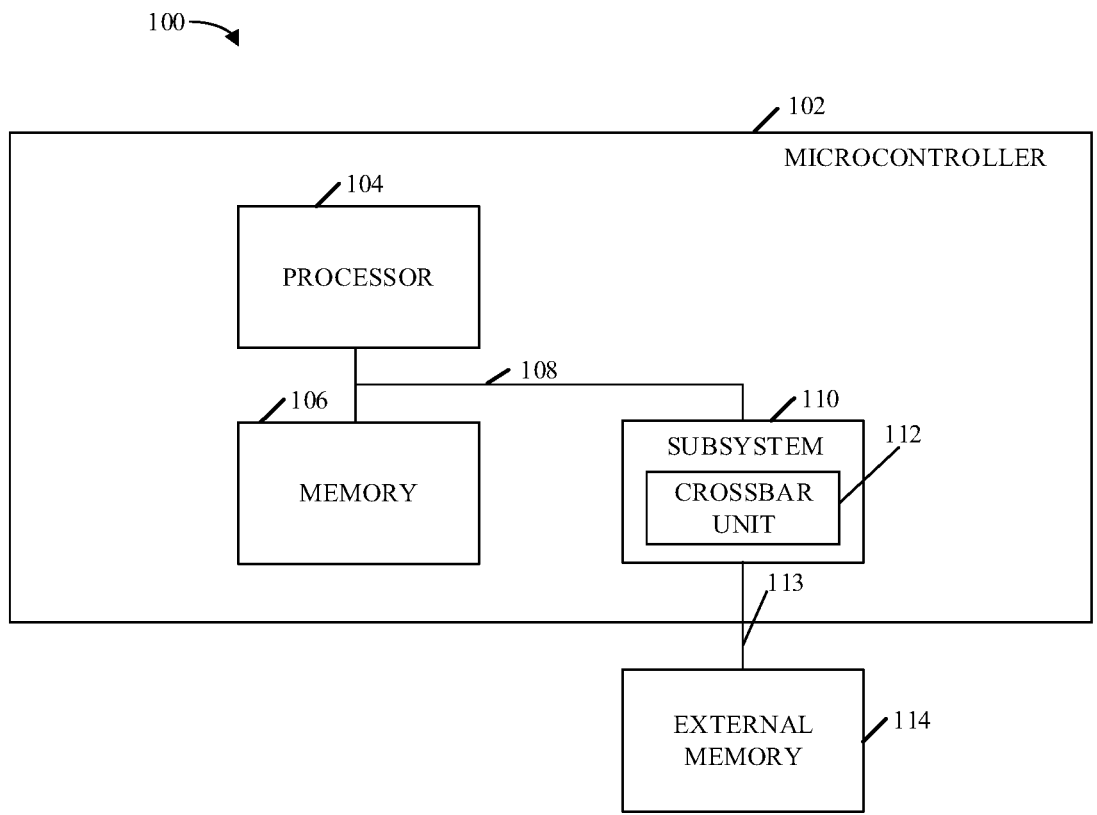
FIG. 1 is a block diagram illustrating a microcontroller system including a subsystem with a crossbar unit according to an example.

FIG. 1 is a block diagram illustrating a microcontroller system 100 according to an example. Microcontroller system 100 may include application-specific integrated circuits (ASICs), field-programmable gate arrays (FPGAs), application processors, digital signal processors (DSPs), networking controllers, video and audio controllers, graphics processing units, digital components such as timers and input/outputs ("I/Os"), analog components such as analog-to-digital converters ("ADC") and analog comparators, communication interfaces, clock sources such as a crystal oscillator, timers such as a real time clock ("RTC"), and the like. Among other components (not shown in FIG. 1), microcontroller system 100 includes microcontroller 102 and external memory 114. Microcontroller 102 includes processor 104, memory 106, and subsystem 110. Subsystem 110 includes crossbar unit 112. In the illustrated example, processor 104, memory 106, and subsystem 110 are communicatively coupled to each other via communication link 108, which may be an internal communication bus. It is noted that various implementations and embodiments may use different components or combinations of components to perform the operations described herein.

Processor 104 includes a central processing unit (CPU) or another suitable processor. In one example, memory 106 stores machine readable instructions executed by processor 104 for operating the microcontroller 102. Memory 106 and external memory 114 includes any suitable combination of volatile and/or non-volatile memory, such as combinations of Random Access Memory (RAM), Read-Only Memory (ROM), flash memory, and/or other suitable memory. These are examples of non-transitory computer readable storage media. Memory 106 and external memory 114 are non-transitory in the sense that they do not encompass a transitory signal but instead are made up of at least one memory component to store machine executable instructions for performing techniques described herein.

In an example, memory 106 may be any type of memory that is embedded on the same die as processor 104 (e.g., the memory 106 may be within the same microcontroller chip as the processor 104). In an example, external (e.g., off-chip) memory 114 is external to the chip or chip-module that houses the microcontroller 102. For example, microcontroller 102 and external memory 114 may be disposed on the same printed circuit board (PCB), or equivalent structure, and may be coupled to each other over PCB tracks/pads, switches, buses, hubs, trace lines, interconnects, wires, and/or any other types of equivalent signal-conducting structures.

In an example, subsystem 110 may be coupled to external memory 114 via a communication link 113, which includes an interconnect bus. Subsystem 110 may be configured to read from external memory 114 and write to external memory 114 via the interconnect bus. In an example, the interconnect bus may include a plurality of different channels to be coupled directly to higher priority masters within the subsystem 110. The crossbar unit 112 may be coupled to a plurality of lower priority masters within the subsystem 110. The crossbar unit 112 may monitor bandwidth usage between the subsystem 110 and the external memory 114, and selectively route traffic between the plurality of lower priority masters and the plurality of different channels based on the monitored bandwidth usage. In other examples, the crossbar unit 112 may be coupled to any or all of the masters within the subsystem 110, and may balance output traffic based on snooping information (e.g., bandwidth usage).

In an example, the various subcomponents or elements of the system 100 may be embodied in a plurality of different systems, where different modules may be grouped or distributed across the plurality of different systems. To achieve its desired functionality, system 100 may include various hardware components. Among these hardware components may be a number of processing devices, a number of data storage devices, a number of peripheral device adapters, and a number of network adapters. These hardware components may be interconnected through the use of a number of busses and/or network connections. The processing devices may include a hardware architecture to retrieve executable code from the data storage devices and execute the executable code. The executable code may, when executed by the processing devices, cause the processing devices to implement at least some of the functionality disclosed herein.

Figure 2A:
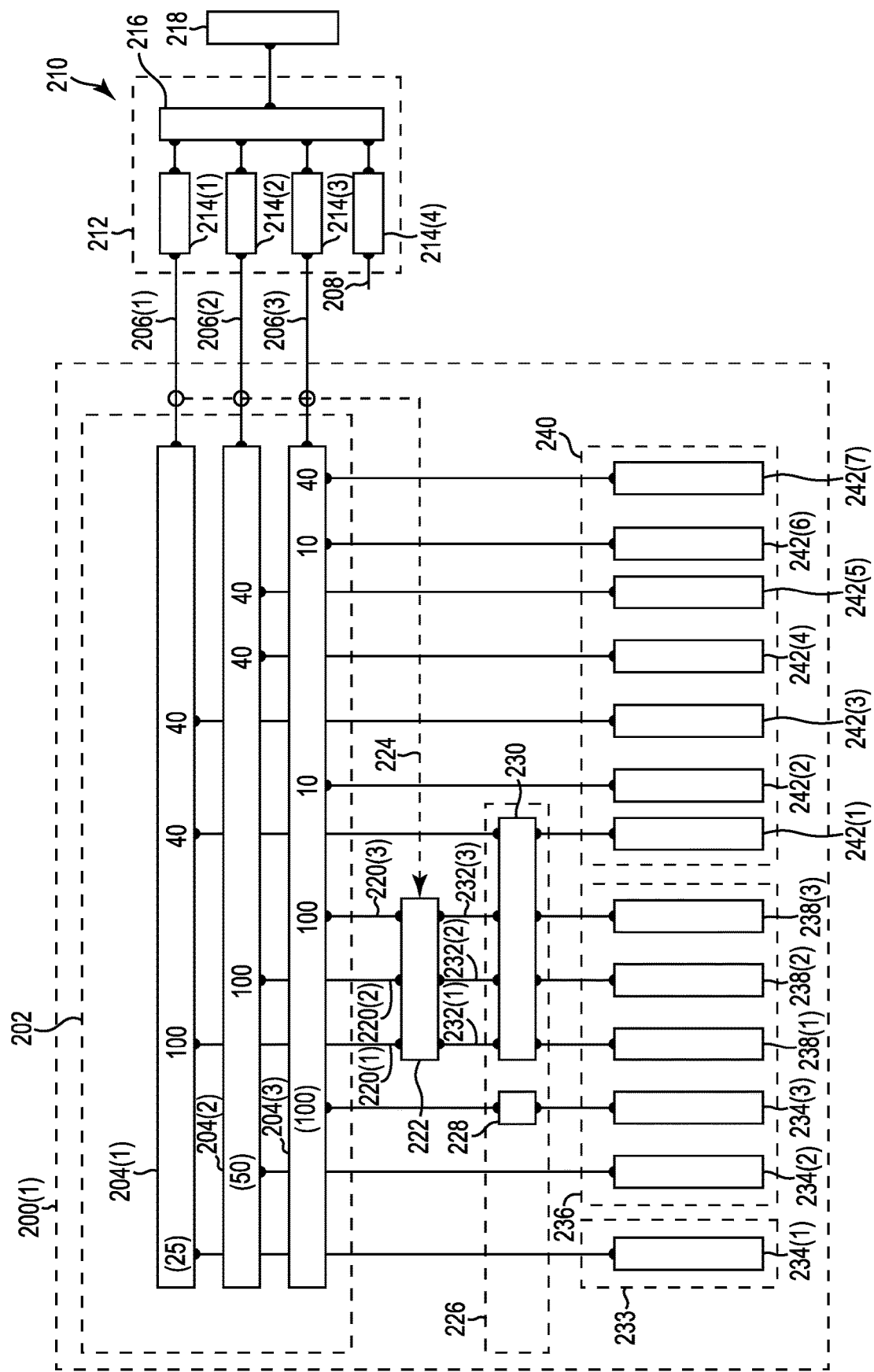
FIG. 2A is a block diagram illustrating a subsystem with a crossbar unit according to an example.

FIG. 2A is a block diagram illustrating a subsystem 200(1) with a crossbar unit 222 according to an example. Subsystem 200(1) is an example implementation of subsystem 110 (FIG. 1). FIG. 2A shows elements of the subsystem 200(1) for read memory accesses. In an example, subsystem 200(1) is a video subsystem of microcontroller 102. Subsystem 200(1) includes interconnect bus 202, crossbar unit 222, graphics caches 226, JPEG decoder bus masters 233, 2D graphics bus masters 236, and video input/output bus masters 240.

In an example, interconnect bus 202 is an AXI interconnect bus. AXI is a bus structure within the microcontroller which connects subsystems (including, but not limited to, CPU subsystems, analog subsystems, digital subsystems, memory subsystems, clock subsystems, and I/O subsystems) and/or components (for example, analog-to-digital converters, memory, sensor controllers, and real time clocks). In an example, interconnect bus 202 includes three channels 204(1)-204(3) (collectively referred to as channels 204). In an example, interconnect bus 202 provides a bus infrastructure that serves as a routing fabric for AXI transactions initiated by bus masters, and also performs decoding, bus arbitration, and error handling.

Interconnect bus 202 is coupled to external memory 210. External memory 210 is an example implementation of external memory 114 (FIG. 1). In an example, external memory 210 is a Low-Power Double Data Rate 4 (LPDDR4) memory. External memory 210 includes wrapper and memory controller (e.g., LPDDR4 memory controller) 212 and memory 218 (e.g., LPDDR4 memory). Wrapper and memory controller 212 includes ports 214(1)-214(4) (collectively referred to as ports 214) and arbiter 216. As shown in FIG. 2A, channel 204(1) is coupled to port 214(1) via communication link 206(1); channel 204(2) is coupled to port 214(2) via communication link 206(2); and channel 204(3) is coupled to port 214(3) via communication link 214(3). Port 214(4) may be coupled to a CPU subsystem via communication link 208.

In an example, channels 204 perform arbitration by port identification (ID), and arbiter 216 performs arbitration by master ID. In an example, arbitration provided by arbiter 216 is priority based with round-robin arbitration within an arbitration priority group. The priority may be looked up by the master ID. Arbitration may be deferred (i.e., the arbitration is calculated for the next cycle). The AXI master that currently performs a transaction takes part in the arbitration, which may cause idle cycles. However, an advantage is that the master with the highest priority may permanently win the arbitration and it can perform back-to-back transfers even if there are other requesting masters.

Graphics caches 226 include command cache 228 and pixel cache 230. JPEG decoder masters 233 include JPEG decoder read master 234(1), which is coupled directly to channel 204(1) of interconnect bus 202. 2D graphics masters includes drawing read master 234(2), command sequence read master 234(3), and fetchblit read masters 238(1)-238(3). Drawing read master 234(2) is coupled directly to channel 204(2) of interconnect bus 202. Command sequence read master 234(3) is coupled to channel 204(3) of interconnect bus 202 via command cache 228. Fetchblit read masters 238(1)-238(3) are coupled to crossbar unit 222 via pixel cache 230. In other examples, masters 238(1)-238(3) may be coupled directly to the crossbar unit 222.

Video input/output masters 240 include fetch warp master 242(1), fetch eco master 242(2), fetch decode master 242(3), fetch layer master 242(4), fetch decode master 242(5), fetch eco master 242(6), and fetch layer master 242(7). Fetch warp master 242(1) is coupled to channel 204(1) of interconnect bus 202 via pixel cache 230. Fetch eco master 242(2) is coupled directly to channel 204(3) of interconnect bus 202. Fetch decode master 242(3) is coupled directly to channel 204(1) of interconnect bus 202. Fetch layer master 242(4) is coupled directly to channel 204(2) of interconnect bus 202. Fetch decode master 242(5) is coupled directly to channel 204(2) of interconnect bus 202. Fetch eco master 242(6) is coupled directly to channel 204(3) of interconnect bus 202. Fetch layer master 242(7) is coupled directly to channel 204(3) of interconnect bus 202.

In an example, bus masters, such as masters 233, 236, and 240, which access the external memory 210 through the interconnect bus 202, are all internal to the subsystem 200(1). As there are many bus masters, the interconnect bus 202 takes cares of bus arbitration. In an example, each of the masters shown in FIG. 2A has an assigned traffic priority of low, medium, or high. Some masters have higher priority than others to avoid visible video defects. In an example, masters 238(1)-238(3) are low priority masters (collectively referred to as low priority masters 238); masters 234(1), 234(2), and 234(3) are medium priority masters (collectively referred to as medium priority masters 234); and masters 242(1)-242(7) are high priority masters (collectively referred to as high priority masters 242). In an example, each of the medium priority masters 234 and high priority masters 242 are coupled directly to the interconnect bus 202, or are connected to the interconnect bus 202 via one of the graphics caches 226. In an example, none of the medium priority masters 234 or high priority masters 242 are coupled to the crossbar unit 222. In an example, each of the low priority masters 238 is coupled to the interconnect bus 202 via the pixel cache 230 and the crossbar unit 222.

In the example shown in FIG. 2A, the high priority masters 242 have lower limits on the amount of bandwidth that can be requested compared to the low priority masters 238, and that bandwidth is spread relatively evenly across the three channels 204. As shown in FIG. 2A, channel 204(1) has a maximum bandwidth of 80% (40%+40%) that may be requested by high priority masters 242(1) and 242(3); channel 204(2) has a maximum bandwidth of 80% (40%+40%) that may be requested by high priority masters 242(4) and 242(5); and channel 204(3) has a maximum bandwidth of 60% (10%+10%+40%) that may be requested by high priority masters 242(2), 242(6), and 242(7). The high priority masters 242 are considered "high priority" as used herein because they may not be able to tolerate significant latency. In contrast, the low priority masters 238 are considered "low priority" because they are able to tolerate more latency than the high priority masters 242.

The crossbar unit 222 includes three slave ports 232(1)-232(3) to receive read memory requests from low priority masters 238(1)-238(3), respectively. The crossbar unit 222 includes three master ports 220(1)-220(3) that are respectively coupled to channels 204(1)-204(3) of interconnect bus 202. The crossbar unit 222 may also include an Advanced High-Performance Bus ("AHB") port to read/write internal registers, as well as reordering logic. In an example, the crossbar unit 222 includes a monitoring mechanism 224 to snoop or monitor the traffic at each of the communication links 206(1)-206(3) between the interconnect bus 202 and the external memory 210. In other examples, the monitoring mechanism 224 may monitor traffic at other locations within subsystem 200(1). The crossbar unit 222 may include an ordering mechanism to send AXI data transactions in order through the slave ports 232(1)-232(3).

In an example, crossbar unit 222 balances the traffic routing of low priority read memory requests from low priority masters 238 across the multiple channels 204 of the interconnect bus 202 based on the information from monitoring mechanism 224 to improve the bandwidth efficiency of the system. The numbers on the channels 204 indicate the percentage of the total bandwidth of that channel 204 that may be requested by each of the masters. For example, master 242(7) can request up to 40 percent of the bandwidth of channel 204(3). In an example, crossbar unit 222 dynamically arbitrates AXI accesses from the low priority masters 238 to the port 214(1), 214(2), or 214(3) of the external memory 210 with the lowest bandwidth, and thereby helps to ensure that high priority masters 242 are receiving their required bandwidth. The bandwidth requirements may not be constant in time, and in some time periods, some bus masters may demand more bandwidth than is available for one channel 204. In this bottleneck condition for one channel 204, there may be other channels 204 with less bandwidth demand than its maximum. The crossbar unit 222 addresses this issue by routing the read memory requests from the low priority masters to a channel 204 of interconnect bus 202 with less bandwidth demand to avoid congestions in the channels 204.

In an example, crossbar unit 222 includes a plurality of selectable operating modes, including a neutral mode, a static mode, a dynamic readiness mode, and a load dynamic mode. In the neutral mode, the crossbar unit 222 is deactivated, and all slave ports 232 are directly connected to their respective master ports 220. In the static mode, the crossbar unit 222 uses a static mapping between slave ports 232 and master ports 220 based on the value in a configuration register. In the dynamic readiness mode, the crossbar unit 222 uses a dynamic mapping between slave ports 232 and master ports 220 based on a ready status of arbiter inputs of the interconnect bus 202, and the port with the longest time since the arbiter was busy may be selected. In the load dynamic mode, the crossbar unit 222 uses a dynamic mapping between slave ports 232 and master ports 220 based on data bandwidth usage (e.g., outstanding transaction count for arbiter outputs of the interconnect bus 202), and the port with the lowest data bandwidth usage may be selected.

Figure 2B:
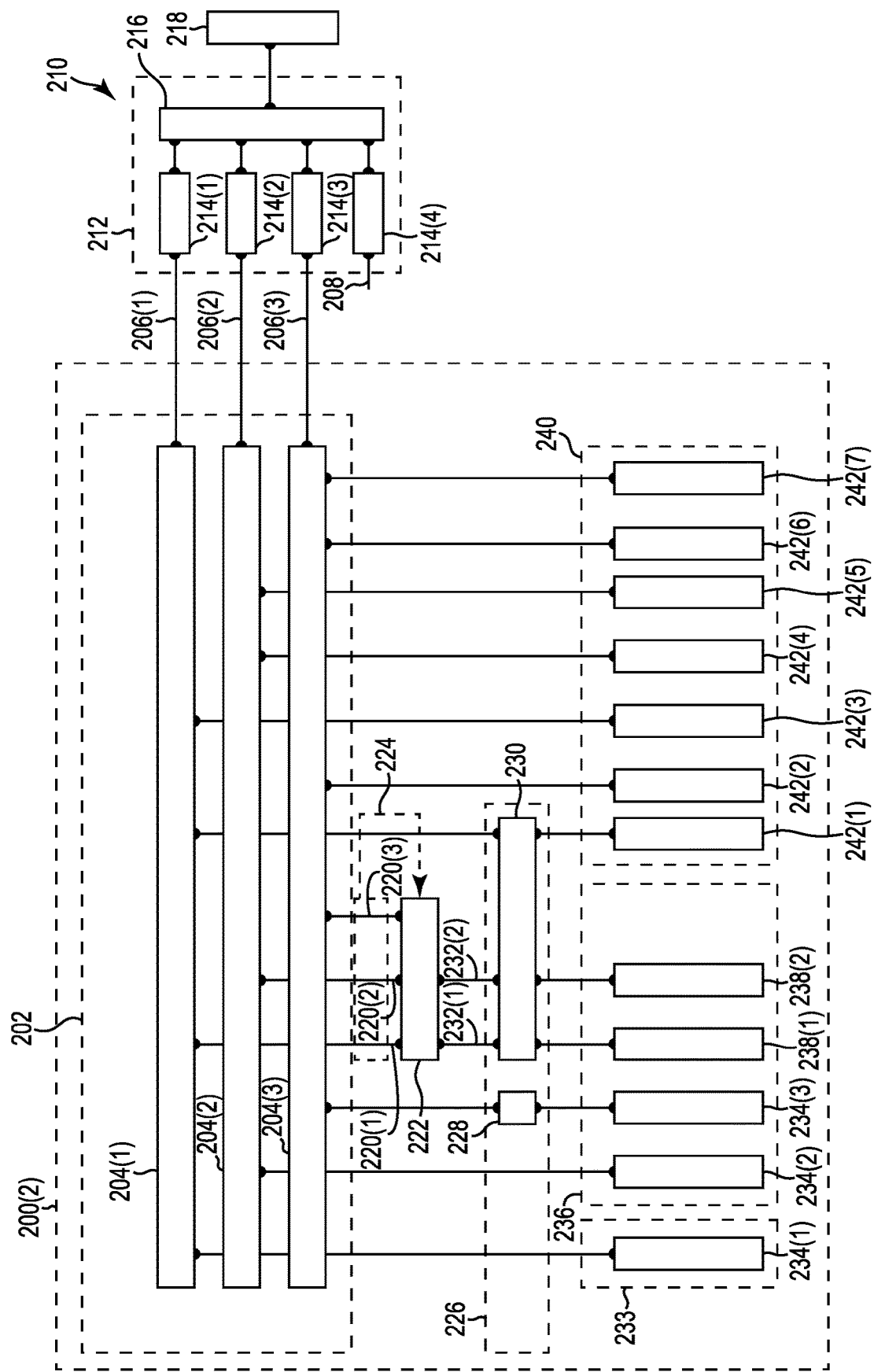
FIG. 2B is a block diagram illustrating a subsystem with a crossbar unit according to another example.

FIG. 2B is a block diagram illustrating a subsystem 200(2) with a crossbar unit 222 according to another example. Subsystem 200(2) is another example implementation of subsystem 110 (FIG. 1). FIG. 2B shows elements of the subsystem 200(2) for read memory accesses. In an example, subsystem 200(2) is a video subsystem of microcontroller 102.

As shown in FIG. 2B, each of the masters 238(1) and 238(2) is coupled to the interconnect bus 202 via the pixel cache 230 and the crossbar unit 222. In the illustrated example, the monitoring mechanism 224 of the crossbar unit 222 snoops or monitors the traffic at the three master ports 220(1)-220(3) that are respectively coupled to channels 204(1)-204(3) of interconnect bus 202. In other examples, the monitoring mechanism 224 may monitor traffic at other locations within subsystem 200(2).

In an example, crossbar unit 222 balances the traffic routing of read memory requests from masters 238(1) and 238(2) across the multiple channels 204 of the interconnect bus 202 based on the information from monitoring mechanism 224 to improve the bandwidth efficiency of the system. In an example, crossbar unit 222 balances the unbalanced traffic of the masters 238(1) and 238(2) so that each of the three channels 204 will receive 33.33% of the total bandwidth from the masters 238(1) and 238(2).

As an example, assume that without the crossbar unit 222 or with the crossbar unit 222 in the static mode, master 238(1) can request 50% of the bandwidth of channel 204(1), and master 238(2) can request 50% of the bandwidth of channel 204(2). Assume further that masters 234(1), 242(1), 242(3) can request 25%, 20%, and 20%, respectively, of the bandwidth of channel 204(1) maximum. If all of the masters connected to channel 204(1) are at 100% of their bandwidth usage, these masters will be using 115% (i.e., 25%+50%+20%+20%) of the bandwidth of channel 204(1). However, using the crossbar unit 222 in a load dynamic mode, the masters will use 98.33% (i.e., 25%+33.33% (max)+20%+20%) of the bandwidth of channel 204(1).

Figure 2C:
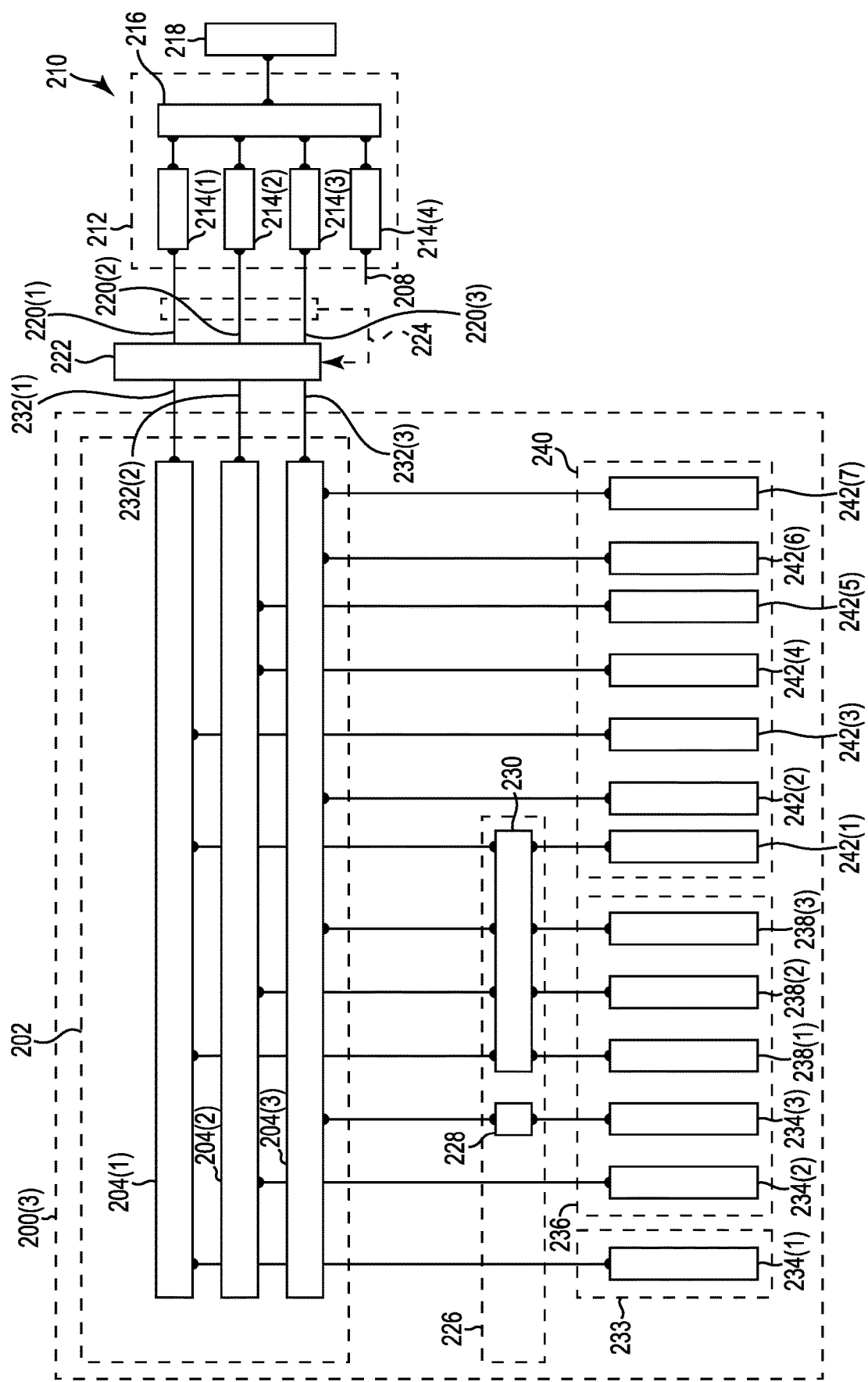
FIG. 2C is a block diagram illustrating a subsystem with a crossbar unit according to another example.

FIG. 2C is a block diagram illustrating a subsystem 200(3) with a crossbar unit 222 according to another example. Subsystem 200(3) is another example implementation of subsystem 110 (FIG. 1). FIG. 2C shows elements of the subsystem 200(3) for read memory accesses. In an example, subsystem 200(3) is a video subsystem of microcontroller 102.

As shown in FIG. 2C, the crossbar unit 222 is coupled between the interconnect bus 202 and the external memory 210. The crossbar unit 222 shown in FIG. 2C may be internal or external to the subsystem 200(3). In the illustrated example, the monitoring mechanism 224 of the crossbar unit 222 snoops or monitors the traffic at the three master ports 220(1)-220(3) that are respectively coupled to ports 214(1)-214(3) of wrapper and memory controller 212. In other examples, the monitoring mechanism 224 may monitor traffic at other locations within subsystem 200(3). In an example, crossbar unit 222 balances the traffic routing of read memory requests from all masters 234, 238, and 242 across the multiple ports 214(1)-214(3) based on the information from monitoring mechanism 224 to improve the bandwidth efficiency of the system.

Figure 3:
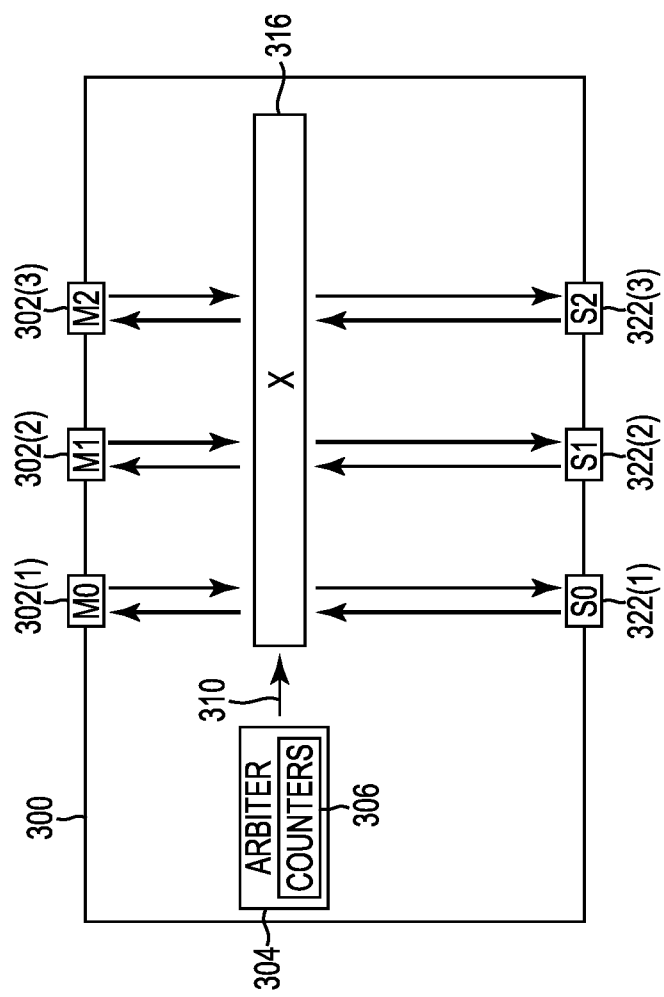
FIG. 3 is a block diagram illustrating an address channel of a crossbar unit according to an example.

FIG. 3 is a block diagram illustrating an address channel 300 of a crossbar unit according to an example. In an example, address channel 300 is part of crossbar unit 222 (FIGS. 2A-2C). The address channel 300 includes master ports 302(1)-302(3) (collectively referred to as master ports 302), arbiter 304, crossbar routing element 316, and slave ports 322(1)-322(3) (collectively referred to as slave ports 322). Arbiter 304 includes counters 306. In an example, address channel 300 includes as many counters 306 as the number of master ports 302, and each of the counters 306 corresponds to one of the master ports 302. The crossbar routing element 316 selectively routes transactions between the master ports 302 and the slave ports 322 based on the operating mode of the crossbar unit and the values of the counters 306.

The counters 306 may be used in different configurations depending on the operating mode of the crossbar unit. In the first configuration corresponding to the dynamic readiness mode, the counter 306 for each port 302 is reset when the arbiter is busy with higher priority traffic and sets a masn_arready bit to low. When the masn_arready bit is set to high, each cycle is counted by the counters 306. The counters 306 measure the time since masn_arready was low the last time. The port selection criteria is the port with the highest count value, and the arbiter 304 selects this port with a port selection signal 310. In the second configuration corresponding to the load dynamic mode, the counters 306 are incremented with the byte length of the address request and decremented when the requested data is received. In another example, the counters 306 are incremented by one with each address request, and decremented by one when the requested data is received.

Figure 4:
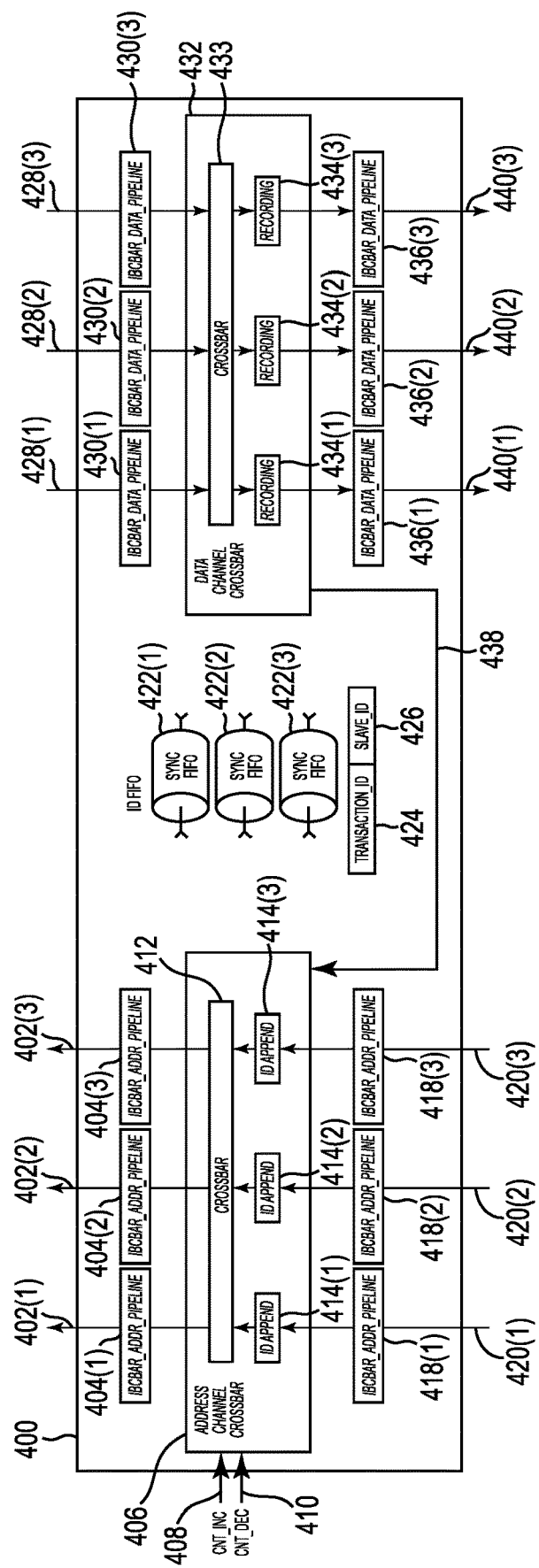
FIG. 4 is a block diagram illustrating address and data channels of a crossbar unit according to an example.

FIG. 4 is a block diagram illustrating address and data channels 400 of a crossbar unit according to an example. In an example, address and data channels 400 are part of crossbar unit 222 (FIGS. 2A-2C). The address and data channels 400 include master address ports 402(1)-402(3) (collectively referred to as master address ports 402), master address pipelines 404(1)-404(3) (collectively referred to as master address pipelines 404), address channel crossbar 406, slave address pipelines 418(1)-418(3) (collectively referred to as slave address pipelines 418), slave address ports 420(1)-420(3) (collectively referred to as slave address ports 420), synchronous first-in first-out (FIFO) buffers 422(1)-422(3) (collectively referred to as FIFOs 422), master data ports 428(1)-428(3) (collectively referred to as master data ports 428), master data pipelines 430(1)-430(3) (collectively referred to as master data pipelines 430), data channel crossbar 432, slave data pipelines 436(1)-436(3) (collectively referred to as slave data pipelines 436), and slave data ports 440(1)-440(3) (collectively referred to as slave data ports 440).

Address channel crossbar 406 includes crossbar routing unit 412 and ID append logic elements 414(1)-414(3) (collectively referred to as ID append logic 414). Data channel crossbar 432 includes crossbar routing unit 433 and reordering logic elements 434(1)-434(3) (collectively referred to as reordering logic 434).

For every address request received via slave address ports 420, information is added to the request to be able to route the incoming data properly to its slave data port 440. In an example, every incoming address request is tagged to be able to later perform ordering at the data channel. Address requests are received via the slave address ports 420, and provided to the ID append logic 414 via slave address pipelines 418. In an example, ID append logic 414 appends ID information to each address request including a transaction ID 424 and a slave ID 426. The slave ID 426 is used to identify to which slave should be routed back the incoming data. The transaction ID 424 is used to identify the transaction order. For example, a data transaction with transaction ID "2" may be stored in reordering memory at the data channel crossbar 432 until it can be sent to the port if a transaction with transaction ID "1" is not yet received.

The ID append logic 414 provides the address requests with the appended ID information to the crossbar routing unit 412, which selectively routes the address requests with the appended ID information to output ports of the crossbar routing unit 412. The routing may be based on a counter value that may be incremented with a cnt_inc signal 408 and decremented with a cnt_dec signal 410. The address requests with the appended ID information are then sent to master address ports 402 via master address pipelines 404. Based on the address requests, data is read from the external memory and data transactions are received at master data ports 428. The data transactions are provided to the crossbar routing unit 433 via the master data pipelines 430. Crossbar routing unit 433 selectively routes the data transactions to the reordering logic 434.

In an example, the ID information of every master port is stored in FIFOs 422. The FIFO ID information may be used in the routing and ordering at the data channel. For example, if an address request is received at the slave address port 420(3), the request may be routed by the address channel crossbar 406 to the master address port 402(2), and the ID information may be stored in its FIFO 422. Once the data is read from the external memory and received at a master data port 428(2), the crossbar routing unit 433 routes it to the path of the slave data port 440(3) associated with the request. The crossbar routing unit routes the data using the slave ID 426 previously stored in the FIFO 422. In this example, the crossbar routing unit 433 routes the data to reordering logic 434(3). The reordering logic 434(3) receives the data and checks if the transaction ID 424 corresponds to the next transaction expected by the cache. The transaction may be stored in memory (e.g., memory 506 shown in FIG. 5) if the transaction ID is not the next expected transaction ID. The transaction may be sent to the slave port 440(3) via slave data pipeline 436(3) if the transaction ID is the next expected transaction ID.

Figure 5:
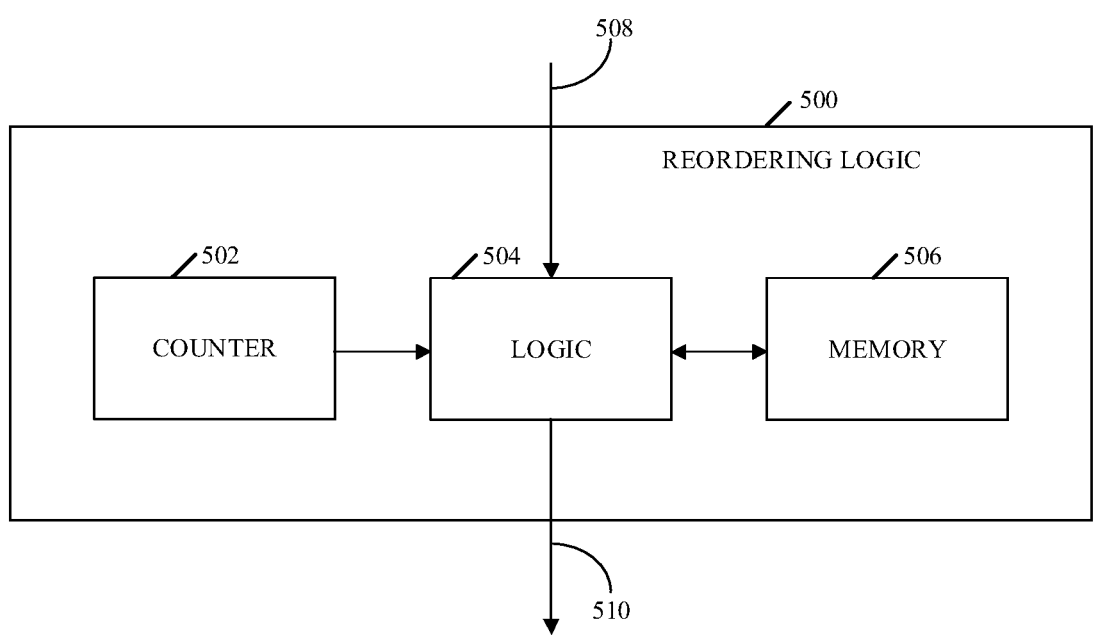
FIG. 5 is a block diagram illustrating a reordering logic element according to an example.

FIG. 5 is a block diagram illustrating a reordering logic element 500 according to an example. Reordering logic 500 is an example implementation of one of the reordering logic elements 434(1)-434(3). In an example, each of the reordering logic elements 434(1)-434(3) may be configured in the manner shown in FIG. 5. Reordering logic element 500 includes counter 502, logic 504, memory 506, port 508, and port 510. Reordering logic element 500 receives data transactions via port 508. Logic 504 may reorder the received data transactions using memory 506 and counter 502 as described in further detail below, and may output the reordered data transactions via port 510.

FIG. 5 is now described in additional detail below with further reference to FIG. 4. The reordering logic 434 may have a counter (e.g., counter 502 shown in FIG. 5) to track what should be the next transaction ID expected by the cache. Assume for example that the data channel receives two data transactions out of order for the slave port 440(2) (e.g., first receives a transaction 0x120, followed later by transaction 0x110). In proper order, it would be transaction 0x110 first and then 0x120. The 0x120 data transaction arrives to the reordering logic 434, which checks if the transaction ID of the transaction matches with the cache expected transaction ID. The cache may have already received a 0x100 data transaction and is expecting a 0x110 transaction. The reordering logic 434 may store the 0x120 data transaction in the reordering memory (e.g., memory 506 shown in FIG. 5) because it does not match the cache expected transaction ID. It does not release the transaction ID to the address channel because the memory is not released yet.

At some later time, the 0x110 data transaction arrives to the reordering logic 434. The reordering logic 434 will determine that its transaction ID matches the next transaction ID expected by the cache, and the transaction ID appended in the address channel is removed before sending it to the cache. The transaction ID is released (as indicated at 438 in FIG. 4) when the data is fully sent to the data pipeline 436 and the address channel can send another request appending that transaction ID. The reordering logic 434 increments the next transaction ID expected by the cache, checks the next transaction ID and determines that it has already been received (i.e., the 0x120 data). The reordering logic 434 will send the 0x120 data to the cache, removing the appended ID. The transaction ID will be released (as indicated at 438 in FIG. 4) to be used in future requests.

Figure 6:
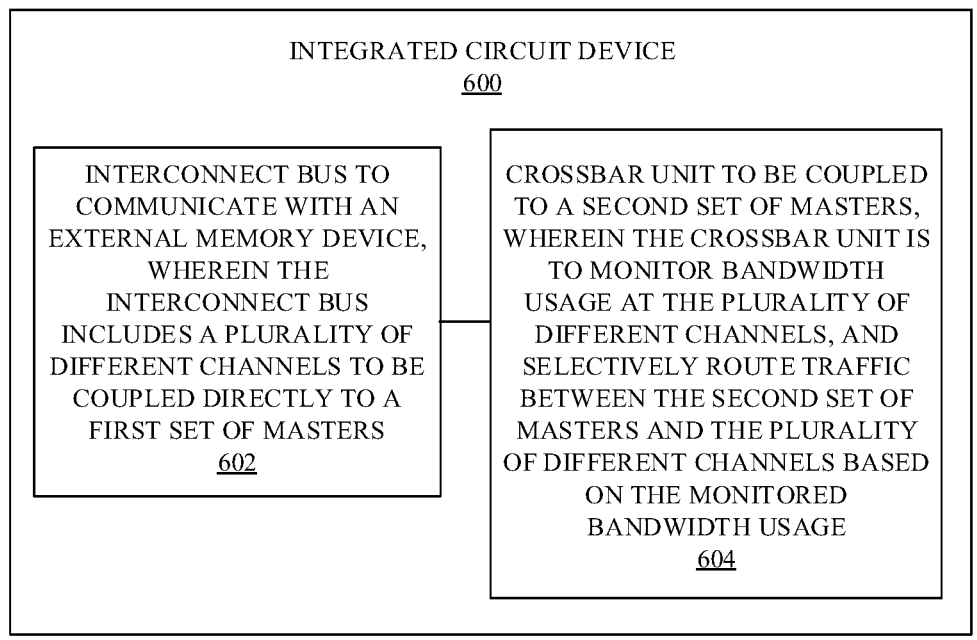
FIG. 6 is a block diagram illustrating an integrated circuit (IC) device according to an example.

An example of the present disclosure is directed to an integrated circuit (IC) device. FIG. 6 is a block diagram illustrating an IC device 600 according to an example. As shown in FIG. 6, IC device 600 includes an interconnect bus 602 to communicate with an external memory device, wherein the interconnect bus includes a plurality of different channels to be coupled directly to a first set of masters. IC device 600 also includes a crossbar unit 604 to be coupled to a second set of masters, wherein the crossbar unit is to monitor bandwidth usage at the plurality of different channels, and selectively route traffic between the second set of masters and the plurality of different channels based on the monitored bandwidth usage.

The interconnect bus 602 may be an AXI bus. The crossbar unit 604 may selectively route the traffic in a manner that balances the traffic across the plurality of different channels. The interconnect bus 602 and the crossbar unit 604 may be part of a video processing subsystem of the IC device. The first set of masters may include a plurality of higher priority masters and the second set of masters may include a plurality of lower priority masters. The plurality of higher priority masters may include high priority masters and medium priority masters, and the plurality of lower priority masters may include low priority masters having a latency tolerance based priority that is lower than a latency tolerance based priority of the high priority masters and the medium priority masters.

The crossbar unit 604 may include at least one counter, and the monitoring the bandwidth usage at the plurality of different channels by the crossbar unit may include incrementing the at least one counter based on read requests sent to the external memory device. The crossbar unit 604 may increment the at least one counter in accordance with a byte length of data requested in each of the read requests. The crossbar unit 604 may decrement the at least one counter when the data requested in the read requests is received. The crossbar unit 604 may include reordering logic to reorder data transactions that are received out of an expected order by the crossbar unit from the external memory device, and the crossbar unit 604 may send the reordered data transactions to the second set of masters.

The crossbar unit 604 may include a plurality of selectable operating modes, and the crossbar unit 604 may selectively route requests between slave ports of the crossbar unit 604 and master ports of the crossbar unit 604 based on a currently selected one of the operating modes. The operating modes may include a load dynamic mode in which the crossbar unit 604 uses a dynamic mapping between the slave ports and the master ports based on data bandwidth usage for each of the plurality of different channels of the interconnect bus 602 (e.g., counting the on-the-fly data in the channels). The operating modes may further include a dynamic readiness mode in which the crossbar unit 604 uses a dynamic mapping between the slave ports and the master ports based on a ready status of the plurality of different channels of the interconnect bus 602, wherein the ready status includes respective lengths of time that the plurality of different channels have been busy. The operating modes may further include a neutral mode in which all of the slave ports are directly connected to respective ones of the master ports, and a static mode in which the crossbar unit uses a static mapping between the slave ports and the master ports based on a value in a configuration register.

Figure 7:
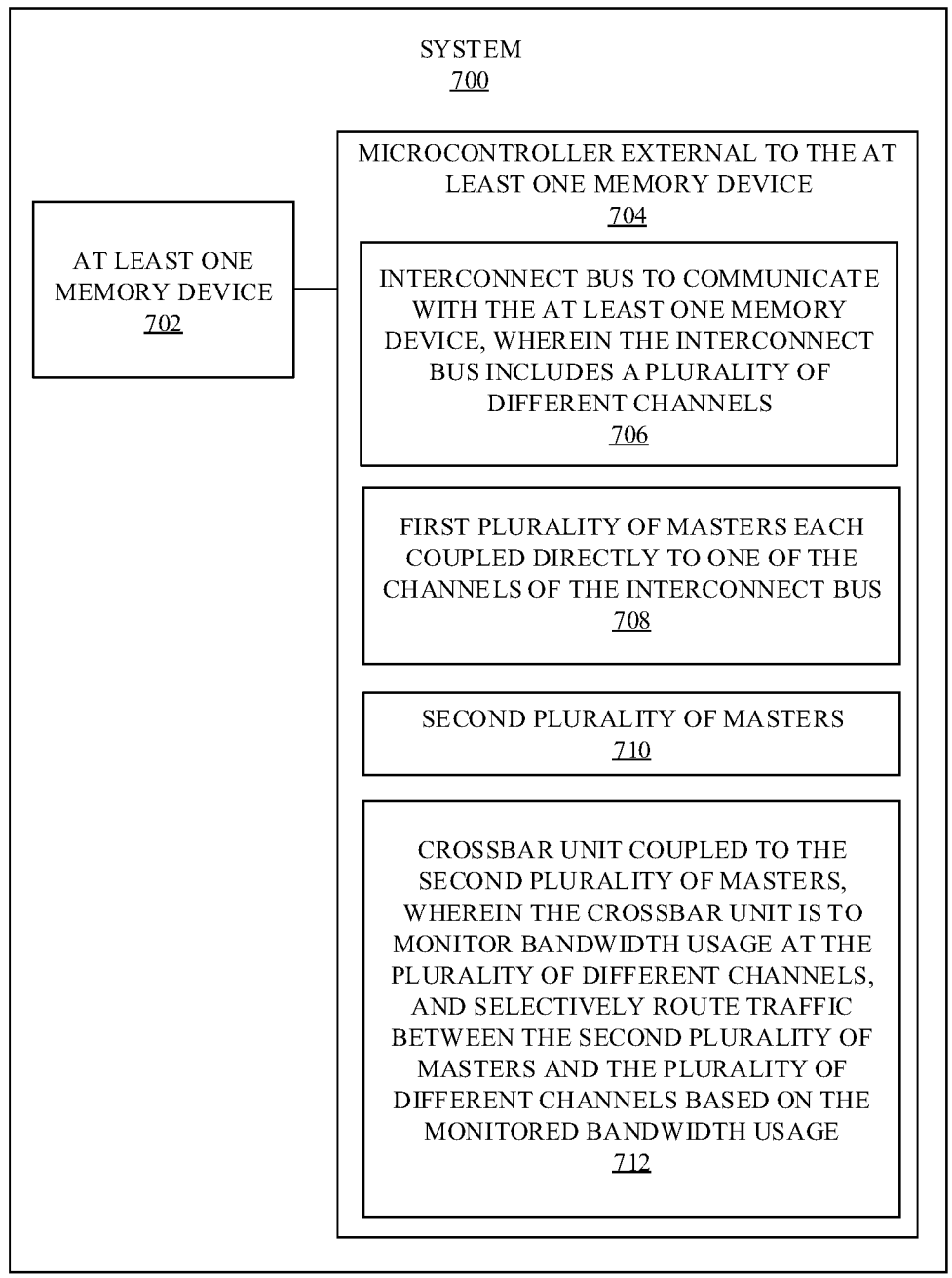
FIG. 7 is a block diagram illustrating a system with a crossbar unit according to an example.

Another example of the present disclosure is directed to a system with a crossbar unit. FIG. 7 is a block diagram illustrating a system 700 with a crossbar unit according to an example. System 700 includes at least one memory device 702, and a microcontroller 704 external to the at least one memory device 702. The microcontroller 704 includes an interconnect bus 706 to communicate with the at least one memory device 702, wherein the interconnect bus 706 includes a plurality of different channels. The microcontroller 704 includes a first plurality of masters 708 each coupled directly to one of the channels of the interconnect bus 706. The microcontroller 704 includes a second plurality of masters 710. The microcontroller 704 includes a crossbar unit 712 coupled to the second plurality of masters 710, wherein the crossbar unit 712 is to monitor bandwidth usage at the plurality of different channels, and selectively route traffic between the second plurality of masters 710 and the plurality of different channels based on the monitored bandwidth usage.

The interconnect bus 706 may be an AXI bus, and the crossbar unit 712 may selectively route the traffic in a manner that balances the traffic across the plurality of different channels of the AXI bus. The crossbar unit 712 may include at least one counter, and the monitoring the bandwidth usage at the plurality of different channels by the crossbar unit 712 may include incrementing the at least one counter based on read requests sent to the at least one memory device. The crossbar unit 712 may include reordering logic to reorder data transactions that are received out of an expected order by the crossbar unit 712 from the at least one memory device, and wherein the crossbar unit 712 is to send the reordered data transactions to the second plurality of masters 710.

Figure 8:
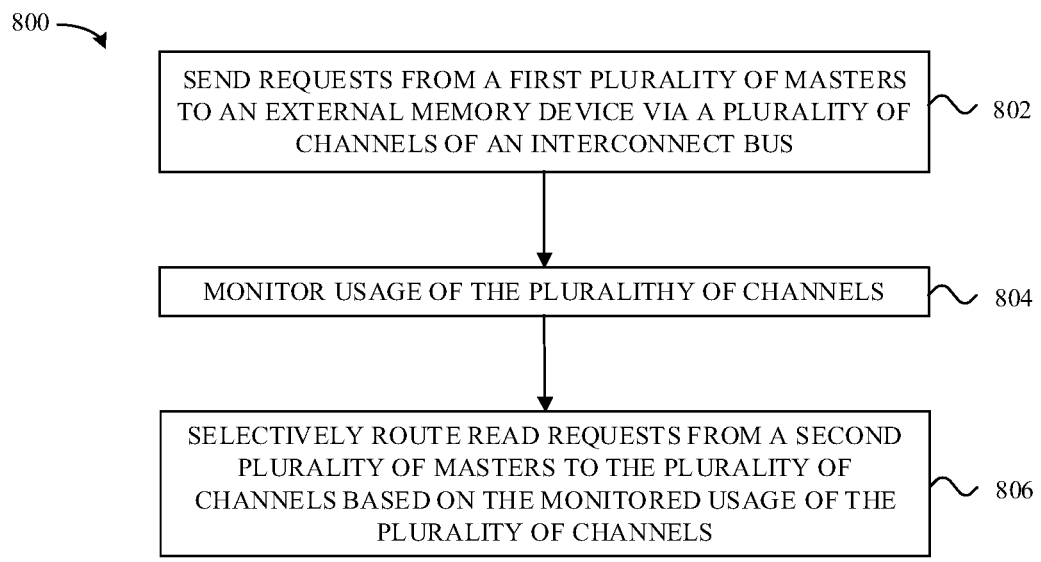
FIG. 8 is a flow diagram illustrating a method of routing read requests according to an example.

Another example of the present disclosure is directed to a method of routing read requests. FIG. 8 is a flow diagram illustrating a method 800 of routing read requests according to an example. At 802, the method 800 includes sending read requests from a first plurality of masters to an external memory device via a plurality of channels of an interconnect bus. At 804, the method 800 includes monitoring usage of the plurality of channels. At 806, the method 800 includes selectively routing read requests from a second plurality of masters to the plurality of channels based on the monitored usage of the plurality of channels.

A crossbar unit may perform the selective routing at 806 in method 800, and the method 800 may further include selecting an operating mode of the crossbar unit; and selectively routing the read requests from the second plurality of low to the plurality of channels based on the monitored usage of the plurality of channels and the selected operating mode of the crossbar unit.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A device comprising:
a subsystem included in a microcontroller;
a crossbar unit configured to communicate with the subsystem, and further configured to communicate with an external memory device via a plurality of channels, wherein the crossbar unit is coupled to a set of masters, wherein the crossbar unit is configured to monitor bandwidth usage at the plurality of channels and route traffic between the set of masters and the plurality of channels based on the monitored bandwidth usage, and
the crossbar unit comprising a crossbar routing element configured to route traffic based on an operating mode of the crossbar unit.

2. The device of claim 1, wherein the plurality of channels is included in a communication link.

3. The device of claim 1, wherein the crossbar unit is configured to selectively route the traffic in a manner that balances the traffic across the plurality of channels.

4. The device of claim 1, wherein the crossbar routing element is further configured to selectively route requests between a plurality of master ports of the crossbar unit and a plurality of slave ports of the crossbar unit based on an operating mode of the crossbar unit.

5. The device of claim 4, wherein the operating mode is one of a plurality of selectable operating modes, and wherein the crossbar routing element is further configured to selectively route requests based on a currently selected operating mode.

6. The device of claim 5, wherein the plurality of selectable operating modes includes a load dynamic mode which uses a dynamic mapping between the slave ports and the master ports based on an outstanding transaction count for each of the plurality of channels.

7. The device of claim 1, wherein the set of masters comprises a set of higher priority masters and a set of lower priority masters.

8. The device of claim 1, wherein the crossbar unit comprises:
at least one counter, and wherein the monitoring the bandwidth usage at the plurality of channels by the crossbar unit comprises incrementing the at least one counter based on read requests sent to the external memory device.

9. The device of claim 1, wherein the subsystem is part of a video processing subsystem.

10. A system comprising:
at least one memory device; and
a microcontroller coupled to the at least one memory device via a plurality of channels, the microcontroller comprising:
a plurality of masters coupled to the plurality of channels;
a crossbar unit configured to communicate with the at least one memory device via the plurality of channels, wherein the crossbar unit is coupled to the plurality of masters, and wherein the crossbar unit is configured to monitor bandwidth usage at the plurality of channels and route traffic between the plurality of masters and the plurality of channels based on the monitored bandwidth usage; and
a crossbar routing element configured to route traffic based on an operating mode of the crossbar unit.

11. The system of claim 10, wherein the plurality of channels is included in a communication link.

12. The system of claim 10, wherein the crossbar unit is configured to selectively route the traffic in a manner that balances the traffic across the plurality of channels.

13. The system of claim 10, wherein the crossbar routing element is further configured to selectively route requests between a plurality of master ports of the crossbar unit and a plurality of slave ports of the crossbar unit based on an operating mode of the crossbar unit.

14. The system of claim 13, wherein the operating mode is one of a plurality of selectable operating modes, and wherein the crossbar routing element is further configured to selectively route requests based on a currently selected operating mode.

15. The system of claim 14, wherein the plurality of selectable operating modes includes a load dynamic mode which uses a dynamic mapping between the slave ports and the master ports based on an outstanding transaction count for each of the plurality of channels.

16. A method comprising:
sending read requests from a plurality of masters to an external memory device via a plurality of channels coupling the external memory device to a crossbar unit;
monitoring, using the crossbar unit, usage of the plurality of channels; and
selectively routing, using a crossbar routing element, read requests from at least some of the plurality of masters to the plurality of channels based on the monitored usage of the plurality of channels, the routing being performed based, at least in part, on an operating mode of the crossbar unit.

17. The method of claim 16, wherein the plurality of channels are included in a communication link.

18. The method of claim 16, wherein the routing further comprises:
selectively routing, using the crossbar unit, traffic in a manner that balances the traffic across the plurality of channels.

19. The method of claim 16, wherein the routing further comprises:
selectively routing, using the crossbar routing element, transactions between a plurality of master ports and a plurality of slave ports based on an operating mode of the crossbar unit.

20. The method of claim 19, wherein the operating mode is one of a plurality of selectable operating modes, and wherein the plurality of selectable operating modes includes a load dynamic mode which uses a dynamic mapping between the slave ports and the master ports based on an outstanding transaction count for each of the plurality of channels.

* * * * *